United States Patent
Colbourn et al.

(10) Patent No.: US 12,103,691 B2
(45) Date of Patent: Oct. 1, 2024

(54) MAGNETIC LOCKING SYSTEM OF AN ELECTRIC AIRCRAFT ROTOR AND METHODS THEREOF

(71) Applicant: BETA AIR, LLC, South Burlington, VT (US)

(72) Inventors: Ben Colbourn, Williston, VT (US); Shawn Cimonetti, South Burlington, VT (US)

(73) Assignee: BETA AIR LLC, South Burlington, VT (US)

( * ) Notice: Subject to any disclaimer, the term of this patent is extended or adjusted under 35 U.S.C. 154(b) by 0 days.

(21) Appl. No.: 17/732,791

(22) Filed: Apr. 29, 2022

(65) Prior Publication Data
US 2023/0348080 A1    Nov. 2, 2023

(51) Int. Cl.
| | |
|---|---|
| *H02K 49/10* | (2006.01) |
| *B64C 29/00* | (2006.01) |
| *B64D 27/24* | (2024.01) |
| *H02K 7/14* | (2006.01) |

(52) U.S. Cl.
CPC .......... *B64D 27/24* (2013.01); *B64C 29/0025* (2013.01); *B64C 29/0091* (2013.01); *H02K 7/14* (2013.01); *H02K 49/106* (2013.01)

(58) Field of Classification Search
CPC . B64D 27/24; B64C 29/0025; B64C 29/0091; H02K 7/14; H02K 49/106
USPC ....................................................... 310/104
See application file for complete search history.

(56) References Cited

U.S. PATENT DOCUMENTS

| | | | |
|---|---|---|---|
| 6,161,799 A | 12/2000 | Nyhus | |
| 8,376,264 B1 | 2/2013 | Hong et al. | |
| 9,157,373 B2 | 10/2015 | Bei et al. | |
| 9,618,939 B2 | 4/2017 | Wolf et al. | |
| 10,279,904 B2 | 5/2019 | Chen | |
| 10,336,436 B2 | 7/2019 | Siu et al. | |
| 10,466,069 B1 | 11/2019 | Kirksey et al. | |
| 11,120,699 B2 | 9/2021 | Connor | |
| 2006/0006751 A1* | 1/2006 | Cavarec | H02K 49/108 310/77 |
| 2011/0298324 A1* | 12/2011 | Peck, Jr. | H02K 7/106 310/98 |
| 2020/0140079 A1* | 5/2020 | Campbell | B64C 27/28 |
| 2020/0385130 A1* | 12/2020 | Verna | B64U 50/13 |

(Continued)

FOREIGN PATENT DOCUMENTS

CN        108803643 B        8/2021

OTHER PUBLICATIONS

U.S. Department of Transportation, Turbine Engine Continued Rotation and Rotor Locking, Jun. 23, 2016.

*Primary Examiner* — Thomas Truong
(74) *Attorney, Agent, or Firm* — Brake Hughes Bellermann LLP

(57) ABSTRACT

A magnetic locking system and methods for restricting movement of an electric aircraft motor is provided. A locking system may include a magnetic lock, which includes a first magnetic component and a second magnetic component. First and second magnetic components may be configured to attract each other and thus lock rotor in a certain position. The first or second magnetic component may include an electromagnet so that magnetic lock may be engaged or disengaged based on one or more parameters, such as a detection by a sensor or a signal generated by a controller.

20 Claims, 5 Drawing Sheets

(56) References Cited

U.S. PATENT DOCUMENTS

2021/0094694 A1\* 4/2021 Seminel ................ H02K 7/183
2021/0123696 A1 4/2021 Johnson
2023/0348080 A1\* 11/2023 Colbourn ............... H02K 7/106

\* cited by examiner

MAGNETIC LOCKING SYSTEM OF AN ELECTRIC AIRCRAFT ROTOR AND METHODS THEREOF

FIELD OF THE INVENTION

The present invention generally relates to the field of aircraft. In particular, the present invention is directed to a magnetic locking system of an electric aircraft rotor and methods thereof.

BACKGROUND

In electric multi-propulsion systems, such as electric vertical take-off and landing (eVTOL) aircraft, movement of a rotor not in use during flight may generate undesirable drag.

SUMMARY OF THE DISCLOSURE

In an aspect, a magnetic locking system for an electric aircraft rotor is provided. A magnetic locking system includes: a magnetic lock having a first magnetic component and a second magnetic component fixedly attached to a rotor of an electric aircraft; and a controller communicatively connected to the magnetic lock, wherein the controller is configured to engage the magnetic lock to prevent a movement of the rotor.

In an aspect, a method for locking a rotor is provided. The method includes: transmitting, by a controller electrically connected to a magnetic lock, a control signal; engaging the magnetic lock, which comprises a first magnetic component and a second magnetic component, in response to the control signal to prevent movement of a rotor of an electric aircraft; and disengaging the magnetic lock, in response to the control signal, so that rotor may move freely.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to a magnetic locking system for an electric aircraft rotor and methods thereof. A magnetic locking system may prevent the movement of a rotor, and thus a corresponding propeller, during operation of an electric aircraft. Such a system is desirable because it prevents drag by a propulsor that is not currently in use.

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting, unless the claims expressly state otherwise.

Figure 1:
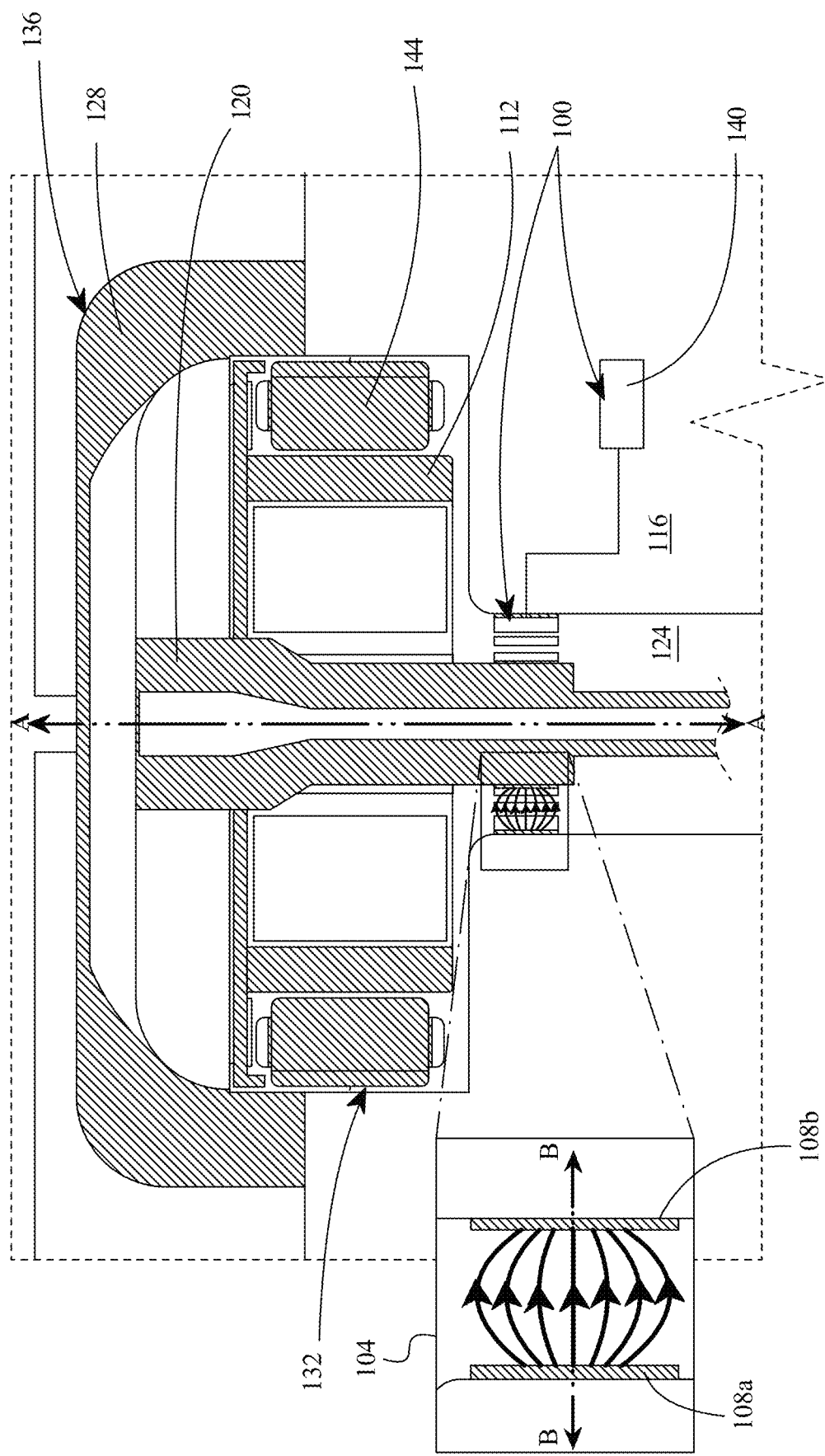
FIG. 1 is an illustration showing a cross-sectional view of an exemplary embodiment a magnetic locking system in one or more aspects of the present disclosure.

Referring now to FIG. 1, a cross-section view of an exemplary embodiment of a magnetic locking system 100 of an electric aircraft rotor is shown in accordance with one or more embodiments of the present disclosure. For the purposes of this disclosure, a "magnetic locking system" is a system and/or device that uses magnetism to limit movement of one or more components of an electric aircraft. In one or more embodiments, magnetic locking system 100 (also referred to in this disclosure as a "system") includes a magnetic lock 104 (also referred to in this disclosure as a "lock"). Magnetic lock 104 includes a first magnetic component 108a and a second magnetic component 108b, where second magnetic component 108b is fixedly attached to a rotor 112 of an electric aircraft 116. For the purposes of this disclosure, a "magnetic component" is an element having magnetic properties. In various embodiments first magnetic component 108a may be attached to electric aircraft 116. In some embodiments, first magnetic component 108a may be attached to a component of a motor 132, such as a stator 144, an impeller, or a housing of the motor. In other embodiments, first magnetic component may be attached to electric aircraft 116 or a portion of a structural feature of electric aircraft 116, such as an airframe structure of electric aircraft 116. For example, and without limitation, first magnetic component 108a may be attached to an interior surface of a cavity 124 of a structure of electric aircraft 116, such as a boom, that motor 132 may be disposed or recessed within. In other embodiments, first component 108a may be attached to any surface adjacent to a surface of rotor 112 that second magnetic component 108b is attached too. Magnetic components 108a,b may be mounted to various opposing surfaces that allow magnetic components 108a,b to face each other. In one or more embodiments, second magnetic component 108b is attached to rotor 112. For example, and without limitation, second magnetic component 108b may be attached to a shaft 120 of rotor 112. In another example, and without limitation, second magnetic component 108b may be attached to a cooling impeller of rotor 112. In another example, and without limitation, second magnetic component may be attached to a flange of rotor 112. In some embodiments, magnetic components 108a,b may each include a monolithic structure, such as a single solid piece of magnetic material. In other embodiments, magnetic components 108a, b may each include a plurality of components, such as a one or more coiled wires, tapes, or bands.

In one or more embodiments, rotor 112 includes a rotor shaft 120, which second magnetic component 108b may be attached thereto. In various embodiments, second magnetic component 108b may be attached to rotor shaft 120 and oriented parallel to longitudinal axis A of rotor shaft 120. In one or more embodiments, magnetic axes of magnetic components 108a,b, such as magnetic axis B, may be substantially orthogonal to a thrust axis of propulsor 136 which may be parallel to axis A. Second magnetic component 108b may be attached to rotor shaft 112 so that a total magnetic moment of magnetic component 108b is substantially perpendicular to axis A of propulsor 136. For example, and without limitation, second magnetic component 108b may be positioned on rotor shaft 120 so that magnetic components 108a,b exert magnetic forces on each other (e.g., attraction) in directions substantially orthogonal to a thrust axis of propulsor 136. Thus, engaging magnetic lock 104 may create a net force between first magnetic component 108a and second magnetic component 108b that is orthogonal to a thrust axis of propulsor 136. In various embodiments, second magnetic component 108b may include a plurality of second magnetic components that are positioned concentrically about axis A of rotor shaft 120 so that magnetic moments of magnetic lock 104 are radially oriented about axis A of rotor shaft 120. Rotor shaft 120 may be securely attached to a propulsor 136, such as a hub 128 of a propulsor 136. By being attached to rotor shaft 120, when system is engaged, shaft 120 may be prevented form rotating about its central axis A, which thus locks rotor 112 in place and prevent movement, such as rotation, or rotor 112. By preventing rotor 112 from moving, drag may be reduced when aircraft 116 is flying but not using a particular propulsor, such as for example, when aircraft 116 is switching between hovering, vertical landing and/or take-off, or rotor-based flight. Transitioning between hovering and other modes of flight, such as fixed-wing flight, may be achieved by locking lift propellers in optimal positions. A lift propeller may be smoothly and monotonically decelerated to an ideal parking speed or position so that locking system may engage and completely cease and restrict movement of the lift propeller during a flight mode transition. Deceleration of propellers may include any system or method of propeller parking as described in U.S. Nonprovisional application Ser. No. 17/732,774, filed on Apr. 29, 2022, and entitled "SYSTEM FOR PROPELLER PARKING CONTROL FOR AN ELECTRIC AIRCRAFT AND A METHOD FOR ITS USE," the entirety of which is incorporated herein by reference. Furthermore, an ideal position of a propulsor may be determined before locking system engages a rotor to maximize the reduction in drag. Determining a low drag position and/or parking position of a propulsor may include any methods of propulsor management as described in U.S. Nonprovisional application Ser. No. 17/362,454, filed on Jun. 29, 2021, and entitled "METHODS OF PROPULSOR MANAGEMENT IN ELECTRIC AIRCRAFT," the entirety of which is incorporated herein by reference. In one or more embodiments, lock 104 may include a plurality of locks. In one or more embodiments, magnetic components, 108a,b may include a plurality of magnetic components. For example, and without limitation, lock 104 may include a plurality of magnetic components 108b, where the magnetic components are circumferentially arranged on a surface of the rotor and about a central axis A of rotor 112. In another example, lock 104 may include a plurality of magnetic components 108a, where the magnetic components 108a are circumferentially arranged on a surface of a cavity 124 within an airframe of electric aircraft 116 that propulsion assembly is disposed therein.

In one or more embodiments, magnetic components 108a,b may be various materials with magnetic properties, such as an electromagnetism, ferromagnetism, paramagnetism, or any other magnetism that allows magnetic components 108a,b to form a magnetic field that result in magnetic attraction between magnetic components 108a,b to each other. For example, and without limitation, first magnetic component 108a may include an electromagnet while and second magnetic component 108b includes a permanent magnet. In another example, and without limitation, first magnetic component 108a includes an electromagnet and second magnetic component 108b includes a ferromagnetic metal. A ferromagnetic metal may include nickel, iron, cobalt, corresponding alloys, and the like. A ferromagnetic material may be a permanent magnet, an electrically-induced magnet, or a material affect by a magnetic field. In one or more embodiments, magnetic components 108a,b may be various shapes and sizes. For instance, magnetic components 108a,b may be any shape or size that allows magnetic components 108a,b to be mounted to a desired surface while still maintaining a magnetic field strength strong enough to stop movement of rotor 112. In one or more embodiments, either magnetic component 108a,b may be an electromagnet so that the magnetic field may be turned on and off as needed. The electromagnet allows for an electrically-induced magnetic field to be develop and thus create an attractive force between magnetic component 108a,b that cause magnetic components 108a,b to lock rotor as discussed further below.

Still referring to FIG. 1, system 100 further includes a controller 140 communicatively connected to magnetic lock 104. Controller 140 is configured to engage magnetic lock 104 to prevent a movement of rotor 112, as previously mentioned. In one or more embodiments, controller 140 is configured to engage lock 104 by transmitting a current through first magnetic component 108a or second magnetic component 108b. In one or more embodiments, controller 140 is configured to initiate a current through first magnetic component 108a and/or second magnetic component 108b to engage magnetic lock 104. Passing a current through a magnetic component induces a magnetic field in the magnetic component so long that as the current is running through the magnetic component an attraction is maintained between magnetic components and rotor is prevented from moving. In some embodiments, controller 140 may generate a signal instructing a power source of electric aircraft 116 or system 100 to create a current that passes through a magnetic component of lock. In one or more embodiments, controller 140 is configured to terminate the current through first magnetic component 108a or second magnetic component 108b to disengage magnetic lock 104 so that rotor 112 may freely move. Once rotor 112 is free to move, rotor 112 may be used in the operation of aircraft 116, such as maneuvering electric aircraft through the air.

Still referring to FIG. 1, system 100 may further include a sensor 148 communicatively connected to controller 140 and configured to detect a characteristic or parameter of system 100 and/or a propulsion assembly. For example, and without limitation, sensor 148 may detect a rotational speed of rotor 112. Sensor 148 may transmit the detected characteristic to controller 140 in a sensor signal as datum so that controller 140 may be configured to receive the sensor datum from sensor 148 and engage magnetic lock 104 if the detected rotational speed of rotor 112 is below a predetermined threshold. For example, and without limitation, is sensor 148 detects that rotor 112 has a rotational speed near zero, then controller 140 may engage lock 104 after determining that the rotational speed of rotor 112 is below a predetermined threshold and is thus not currently in used during operation of electric aircraft 116. In one or more embodiments, controller 140 may be further configured to engage magnetic lock 104 when a rotational speed of rotor 112 is below a predetermined threshold and rotor 112 is not receiving power from a power source of electric aircraft 116. In one or more embodiments, controller 140 may be configured to engage magnetic lock 104 upon a detection by sensor 148 that a control signal from a user has been inputted, such as a throttle input using a throttle lever, as discussed further below.

In one or more embodiments, system 100 may include an encoder that is communicatively connected to controller 140 and motor 132 of propulsor 136. Encoder may be configured to detect a torque input to motor 132 and transmit feedback to controller 140. If the feedback identifies that the torque of motor 132 is below a predetermined threshold, then controller 140 may engage magnetic lock 104 in response to the feedback.

Still referring to FIG. 1, system 100 may be used for a plurality of various flight components having motors with rotors. For, example, and without limitation, system 100 may be used with a propulsor. For the purposes of this disclosure, a "propulsor" is a component or device used to propel a craft by exerting force on a fluid medium, which may include a gaseous medium such as air or a liquid medium such as water. Propulsor may include any device or component that consumes electrical power on demand to propel an electric aircraft in a direction or other vehicle while on ground or in-flight. For example, and without limitation, propulsor may include a rotor, propeller, paddle wheel, and the like thereof. In an embodiment, propulsor may include a plurality of blades. As used in this disclosure a "blade" is a propeller that converts rotary motion from an engine or other power source into a swirling slipstream. In an embodiment, blade may convert rotary motion to push the propeller forwards or backwards. In an embodiment, propulsor may include a rotating power-driven hub, to which are attached several radial airfoil-section blades such that the whole assembly rotates about a longitudinal axis. In one or more exemplary embodiments, propulsor 104 may include a vertical propulsor or a forward propulsor. A forward propulsor may include a propulsor configured to propel aircraft 116 in a forward direction. A vertical propulsor may include a propulsor configured to propel aircraft 116 in an upward direction. One of ordinary skill in the art would understand upward to comprise the imaginary axis protruding from the earth at a normal angle, configured to be normal to any tangent plane to a point on a sphere (i.e. skyward). In an embodiment, vertical propulsor can be a propulsor that generates a substantially downward thrust, tending to propel an aircraft in an opposite, vertical direction and provides thrust for maneuvers. Such maneuvers can include, without limitation, vertical take-off, vertical landing, hovering, and/or rotor-based flight such as "quadcopter" or similar styles of flight.

In an embodiment, propulsor 136 may include a propeller, a blade, or the like. The function of a propeller is to convert rotary motion from an engine or other power source into a swirling slipstream which pushes the propeller forwards or backwards. The propulsor may include a rotating power-driven hub, to which are attached several radial airfoil-section blades such that the whole assembly rotates about a longitudinal axis. The blade pitch of a propeller may, for example, be fixed, manually variable to a few set positions, automatically variable (e.g., a "constant-speed" type), or any combination thereof. In an exemplary embodiment, propellers for an aircraft may be designed to be fixed to their hub at an angle similar to the thread on a screw makes an angle to the shaft; this angle may be referred to as a pitch or pitch angle which will determine the speed of the forward movement as the blade rotates.

In an embodiment, propulsor 136 can include a thrust element which may be integrated into the propulsor. The thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like.

Still referring to FIG. 1, propulsor 136 may include a pusher component. As used in this disclosure a "pusher component" is a component that pushes and/or thrusts an aircraft through a medium. As a non-limiting example, pusher component may include a pusher propeller, a paddle wheel, a pusher motor, a pusher propulsor, and the like. Pusher component may be configured to produce a forward thrust. As used in this disclosure a "forward thrust" is a thrust that forces aircraft through a medium in a horizontal direction, wherein a horizontal direction is a direction parallel to the longitudinal axis. For example, forward thrust may include a force of 1145 N to force aircraft to in a horizontal direction along the longitudinal axis. As a further non-limiting example, pusher component may twist and/or rotate to pull air behind it and, at the same time, push aircraft 108 forward with an equal amount of force. In an embodiment, and without limitation, the more air forced behind aircraft, the greater the thrust force with which aircraft 108 is pushed horizontally will be. In another embodiment, and without limitation, forward thrust may force aircraft 108 through the medium of relative air. Additionally or alternatively, plurality of propulsor may include one or more puller components. As used in this disclosure a "puller component" is a component that pulls and/or tows an aircraft through a medium. As a non-limiting example, puller component may include a flight component such as a puller propeller, a puller motor, a tractor propeller, a puller propulsor, and the like. Additionally, or alternatively, puller component may include a plurality of puller flight components.

In one or more embodiments, propulsor 136 may include a motor 132. Motor 132 may include, without limitation, any electric motor, where an electric motor is a device that converts electrical energy into mechanical energy, for instance by causing a shaft, such as rotor shaft 120, to rotate.

A motor may be driven by direct current (DC) electric power; for instance, a motor may include a brushed DC motor or the like. A motor may be driven by electric power having varying or reversing voltage levels, such as alternating current (AC) power as produced by an alternating current generator and/or inverter, or otherwise varying power, such as produced by a switching power source. A motor may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers or other components for regulating motor speed, rotation direction, torque, and/or dynamic braking.

In one or more embodiments, motor 132 may include or be connected to one or more sensors detecting one or more conditions of motor 132 or components thereof, such as rotor 112. One or more conditions may include, without limitation, voltage levels, electromotive force, current levels, temperature, current speed of rotation, position, torque, and the like. For instance, and without limitation, one or more sensors may be used to detect torque, or to detect parameters used to determine torque, as described in further detail below. One or more sensors may include a plurality of current sensors, voltage sensors, speed or position feedback sensors, and the like. A sensor may communicate a current status of rotor to a person operating system 100 or a computing device; computing device may include any computing device as described below, including without limitation, a controller, a processor, a microprocessor, a control circuit, a flight controller, or the like. In one or more embodiments, computing device may use sensor feedback to calculate performance parameters of motor and/or rotor, including without limitation a torque versus speed operation envelope. Persons skilled in the art, upon reviewing the entirety of this disclosure, will be aware of various devices and/or components that may be used as or included in a motor or a circuit operating a motor, as used and described herein. In an embodiment, propulsors may receive differential power consumption commands, such as a propeller or the like receiving command to generate greater power output owing a greater needed contribution to attitude control, or a wheel receiving a greater power output due to worse traction than another wheel under slippery conditions. In one or more embodiments, sensor may be used to detect movement of rotor 112 or a torque of motor 132. For instance, and without limitation, a sensor may be used to detect torque, or to detect parameters used to determine torque, of motor 132. For example, and without limitation, a sensor may directly measure a movement of motor 132, rotor 112, or propulsor 136 and/or measure an operator input that controls those movements. In one or more embodiments, lock 104 may be engaged by controller 140 when a low revolutions per minute (rpm) of rotor 112 is detected. For example, controller 140 may generate a signal that transmits an electrical signal and/or current to, for example, first magnetic component 108a if a detected rotational speed of rotor 112 falls below a predetermined threshold. Contrastingly, controller 140 may terminate an electrical current if rotational speed of rotor 112 if detected rotational speed of rotor 112 is within the predetermined threshold. For example, and without limitation, current may terminate a current to first magnetic component 108a if a current, real-time torque measurement of motor 132 exceeds a predetermined threshold. For the purposes of this disclosure, a "torque measurement" is a detected parameter and/or phenomenon of the amount of rotational force that a motor develops. Torque input may be detected at the motor (measurement of revolutions) or at pilot control (pilot input).

As used in this disclosure, a "sensor" is a device that is configured to detect an input and/or a phenomenon and transmit information related to the detection. For instance, and without limitation, sensor 148 may detect a user input. A user input may be from an operator control, aircraft 116, environmental characteristic, and the like. In one or more embodiments, the information detected by sensor 148 may be transmitted in the form of an output sensor signal. For example, and without limitation, a sensor may transduce a detected phenomenon, such as and without limitation, a throttle position of an operator control for propulsor 136.

Still referring to FIG. 1, sensor 148 may detect a plurality of characteristics related to system 100. For example, and without limitation, operation characteristics of rotor 112 may be detected by sensor 148 that include position, orientation, voltage, current, speed, pressure, and the like. In one or more embodiments, and without limitation, sensor 148 may include one or more temperature sensors, voltmeters, current sensors, hydrometers, infrared sensors, photoelectric sensors, ionization smoke sensors, motion sensors, pressure sensors, radiation sensors, level sensors, imaging devices, moisture sensors, gas and chemical sensors, flame sensors, electrical sensors, imaging sensors, force sensors, Hall sensors, airspeed sensors, throttle position sensors, and the like. Sensor 148 may be a contact or a non-contact sensor. For example, and without limitation, sensor 148 may be connected to aircraft 116. In other embodiments, sensor 148 may be remote to aircraft 116. Sensor 148 may be communicatively connected to controller 140, which may include a computing device (shown in FIG. 5), processor, pilot control, control circuit, and/or flight controller so that sensor 148 may transmit/receive signals to/from the controller, respectively. Signals, such as signals of sensor 148 and controller 140, may include electrical, electromagnetic, visual, audio, radio waves, or another undisclosed signal type alone or in combination. As used herein, "communicatively connected" is a process whereby one device, component, or circuit is able to receive data from and/or transmit data to another device, component, or circuit. In an embodiment, communicative connecting includes electrically connecting at least an output of one device, component, or circuit to at least an input of another device, component, or circuit.

In one or more embodiments, sensor 148 may include a plurality of sensors in the form of individual sensors or a sensor working individually. A sensor may include a plurality of independent sensors, as described in this disclosure, where any number of the described sensors may be used to detect any number of physical and/or electrical quantities associated with an aircraft subsystem. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of sensor 148 to detect phenomenon may be maintained. In a non-limiting example, a user may alter aircraft usage pursuant to sensor readings.

In one or more embodiments, sensor 148 may include a motion sensor. A "motion sensor", for the purposes of this disclosure, refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. Sensor 148 may include, torque sensor, gyroscope, accelerometer, magnetometer, inertial measurement unit (IMU), pressure sensor, force sensor, proximity sensor, displacement sensor, vibration sensor, or the like. Motion sensors may be selected to detect motion in three directions spanning three dimensions. For instance, and without limitation, a gyro sensor, such as a gyroscope, may be used to detect an orientation of one or more propulsor blades.

In one or more embodiments, sensor 148 may include an encoder, as previously mentioned. An encoder may be configured to detect and determine a motion of motor of propulsor. For example, and without limitation, encoder may be a rotary encoder. In one or more embodiments, encoder may be communicatively connected to controller 140 and controller 140 may initiate or terminate a current supplied to lock 104 depending on detections and determinations by encoder. In one or more exemplary embodiments, encoder is configured to determine a motion of motor 132, such as a speed in revolutions per minute of motor 132. Encoder may be configured to transmit an output signal, which includes feedback, controller; as a result, controller 140 may transmit a signal based on the received feedback from encoder. For example, and without limitation, controller 140 may initiate or maintain an engagement of lock 104 when encoder 208 detects no torque input from motor 132. In another example, and without limitation, controller 140 may disengage lock 104 or retain a disengagement of lock 104 when encoder detects a torque of motor 132.

In one or more embodiments, sensor 148 may include an inertial measurement unit (IMU). In one or more embodiments, an IMU may be configured to detect a change in specific force of a body. An IMU may include an accelerometer, a gyro sensor, a magnetometer, an E-compass, a G-sensor, a geomagnetic sensor, and the like. In some embodiments, sensor 148 may include one or more motion sensors. Sensor 148 may include one or more environmental sensors, including without limitation sensors for detecting wind, speed, temperature, or the like.

In one or more embodiments, sensor 148 may include electrical sensors. Electrical sensors may be configured to measure voltage across a component, electrical current through a component, and resistance of a component. In one or more embodiments, sensor 148 may include thermocouples, thermistors, thermometers, passive infrared sensors, resistance temperature sensors (RTD's), semiconductor based integrated circuits (IC), a combination thereof or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor 148, may be measured in Fahrenheit (° F.), Celsius (° C.), Kelvin (° K), or another scale alone or in combination. The temperature measured by sensors may comprise electrical signals which are transmitted to their appropriate destination wireless or through a wired connection.

In one or more embodiments, sensor 148 may include a sensor suite which may include a plurality of sensors that may detect similar or unique phenomena. For example, in a non-limiting embodiment, sensor suite may include a plurality of accelerometers, a mixture of accelerometers and gyroscope. System 100 may include a plurality of sensors in the form of individual sensors or a sensor suite working in tandem or individually. A sensor suite may include a plurality of independent sensors, as described in this disclosure, where any number of the described sensors may be used to detect any number of physical or electrical quantities associated with an aircraft. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained. Sensor 148 may be configured to detect a pilot input from, for example, a pilot control and/or a controller. In one or more embodiments, a pilot control may include buttons, switches, or other binary inputs in addition to, or alternatively than digital controls about which a plurality of inputs may be received. Pilot control may be configured to receive pilot input. Pilot input may include a physical manipulation of a control like a pilot using a hand and arm to push or pull a lever, or a pilot using a finger to manipulate a switch. Pilot input may include a voice command by a pilot to a microphone and computing system consistent with the entirety of this disclosure. One of ordinary skill in the art, after reviewing the entirety of this disclosure, would appreciate that this is a non-exhaustive list of components and interactions thereof that may include, represent, or constitute, at least aircraft command. A pilot control may include a lever, button, switch, slider, pedal, toggle, joystick, and the like. The manipulation of a pilot control may constitute an aircraft command. A pilot control may be physically located in the cockpit of an aircraft or remotely located outside of the aircraft in another location communicatively connected to at least a portion of the aircraft.

Figure 2:
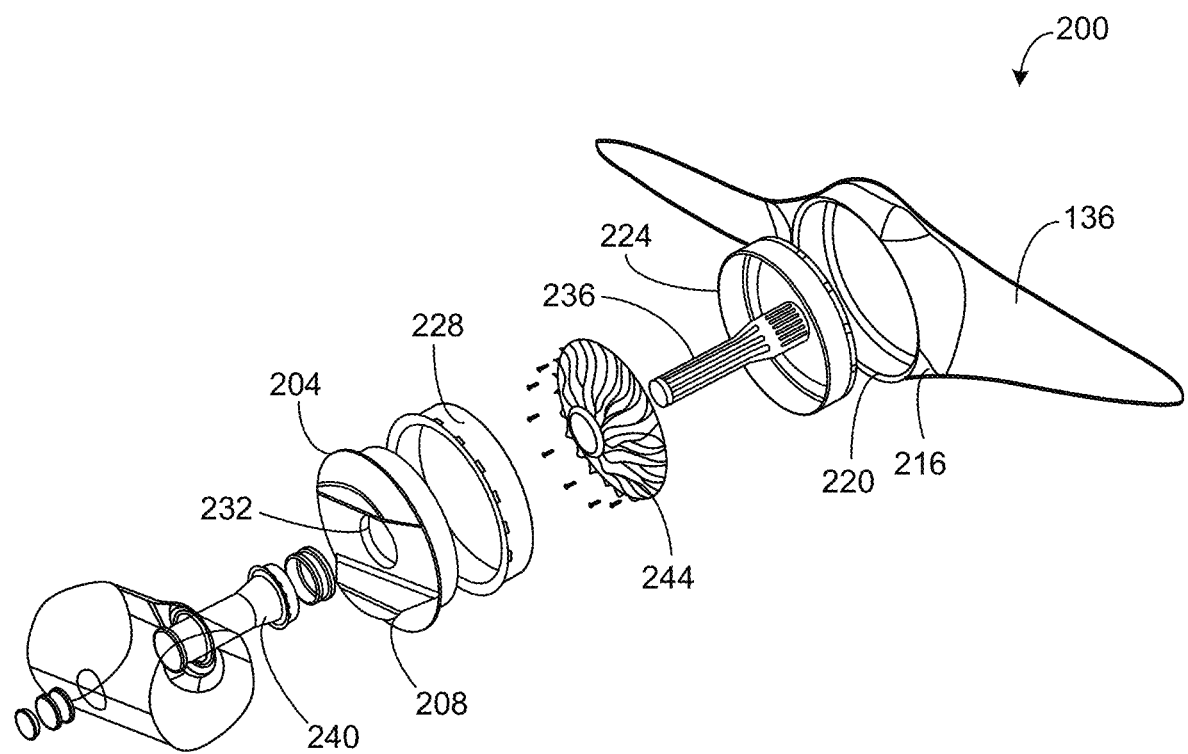
FIG. 2 is an illustration showing an exploded view of an exemplary embodiment of an electric motor in a propulsion system in one or more aspects of the present disclosure.

Referring now to FIG. 2, an exemplary embodiment of an integrated electric propulsion assembly 200 is illustrated. Integrated electric propulsion assembly 200 includes at least a stator 204. Stator 204, as used herein, is a stationary component of a motor and/or motor assembly. In an embodiment, stator 204 includes at least a first magnetic element 208. As used herein, first magnetic element 208 is an element that generates a magnetic field. For example, first magnetic element 208 may include one or more magnets which may be assembled in rows along a structural casing component. Further, first magnetic element 208 may include one or more magnets having magnetic poles oriented in at least a first direction. The magnets may include at least a permanent magnet. Permanent magnets may be composed of, but are not limited to, ceramic, alnico, samarium cobalt, neodymium iron boron materials, any rare earth magnets, and the like. Further, the magnets may include an electromagnet. As used herein, an electromagnet is an electrical component that generates magnetic field via induction; the electromagnet may include a coil of electrically conducting material, through which an electric current flow to generate the magnetic field, also called a field coil of field winding. A coil may be wound around a magnetic core, which may include without limitation an iron core or other magnetic material. The core may include a plurality of steel rings insulated from one another and then laminated together; the steel rings may include slots in which the conducting wire will wrap around to form a coil. A first magnetic element 208 may act to produce or generate a magnetic field to cause other magnetic elements to rotate, as described in further detail below. Stator 204 may include a frame to house components including at least a first magnetic element 208, as well as one or more other elements or components as described in further detail below. In an embodiment, a magnetic field can be generated by a first magnetic element 208 and can comprise a variable magnetic field. In embodiments, a variable magnetic field may be achieved by use of an inverter, a controller, or the like. In an embodiment, stator 204 may have an inner and outer cylindrical surface; a plurality of magnetic poles may extend outward from the outer cylindrical surface of the stator. In an embodiment, stator 204 may include an annular stator, wherein the stator is ring-shaped. In an embodiment, stator 204 is incorporated into a DC motor where stator 204 is fixed and functions to supply the magnetic fields where a corresponding rotor, as described in further detail below, rotates.

Still referring to FIG. 2, integrated electric propulsion assembly 200 includes propulsor 136. In embodiments, propulsor 136 can include an integrated rotor. As used herein, a rotor is a portion of an electric motor that rotates with respect to a stator of the electric motor, such as stator 204. A propulsor, as used herein, is a component or device used to propel a craft by exerting force on a fluid medium, which may include a gaseous medium such as air or a liquid medium such as water. Propulsor 136 may be any device or component that consumes electrical power on demand to propel an aircraft or other vehicle while on ground and/or in flight. Propulsor 136 may include one or more propulsive devices. In an embodiment, propulsor 136 can include a thrust element which may be integrated into the propulsor. A thrust element may include any device or component that converts the mechanical energy of a motor, for instance in the form of rotational motion of a shaft, into thrust in a fluid medium. For example, a thrust element may include without limitation a marine propeller or screw, an impeller, a turbine, a pump-jet, a paddle or paddle-based device, or the like. As another non-limiting example, at least a propulsor may include an eight-bladed pusher propeller, such as an eight-bladed propeller mounted behind the engine to ensure the drive shaft is in compression. Persons skilled in the art, upon reviewing the entirety of this disclosure, will be aware of various devices that may be used as at least a thrust element. As used herein, a propulsive device may include, without limitation, a device using moving or rotating foils, including without limitation one or more rotors, an airscrew or propeller, a set of airscrews or propellers such as contra-rotating propellers, a moving or flapping wing, or the like.

In an embodiment, propulsor 136 may include at least a blade. As another non-limiting example, a propulsor may include an eight-bladed pusher propeller, such as an eight-bladed propeller mounted behind the engine to ensure the drive shaft is in compression. Persons skilled in the art, upon reviewing the entirety of this disclosure, will be aware of various devices that may be used as propulsor 136. In an embodiment, when a propulsor twists and pulls air behind it, it will, at the same time, push the aircraft forward with an equal amount of force. The more air pulled behind the aircraft, the more the aircraft is pushed forward.

In an embodiment, thrust element may include a helicopter rotor incorporated into propulsor 136. A helicopter rotor, as used herein, may include one or more blade or wing elements driven in a rotary motion to drive fluid medium in a direction axial to the rotation of the blade or wing element. Its rotation is due to the interaction between the windings and magnetic fields which produces a torque around the rotor's axis. A helicopter rotor may include a plurality of blade or wing elements.

Continuing to refer to FIG. 2, propulsor 136 can include a hub 216 rotatably mounted to stator 204. Rotatably mounted, as described herein, is functionally secured in a manner to allow rotation. Hub 216 is a structure which allows for the mechanically connected of components of the integrated rotor assembly. In an embodiment, hub 216 can be mechanically connected to propellers or blades. In an embodiment, hub 216 may be cylindrical in shape such that it may be mechanically joined to other components of the rotor assembly. Hub 216 may be constructed of any suitable material or combination of materials, including without limitation metal such as aluminum, titanium, steel, or the like, polymer materials or composites, fiberglass, carbon fiber, wood, or any other suitable material. Hub 216 may move in a rotational manner driven by interaction between stator and components in the rotor assembly. Persons skilled in the art, upon reviewing the entirety of this disclosure, will be aware of various structures that may be used as or included as hub 216, as used and described herein.

Still referring to FIG. 2, propulsor 136 can include a second magnetic element 220, which may include one or more further magnetic elements. Second magnetic element 220 generates a magnetic field designed to interact with first magnetic element 208. Second magnetic element 220 may be designed with a material such that the magnetic poles of at least a second magnetic element are oriented in an opposite direction from first magnetic element 208. In an embodiment, second magnetic element 220 may be affixed to hub 216. Affixed, as described herein, is the attachment, fastening, connection, and the like, of one component to another component. For example, and without limitation, affixed may include bonding the second magnetic element 220 to hub 216, such as through hardware assembly, spot welding, riveting, brazing, soldering, glue, and the like. Second magnetic element 220 may include any magnetic element suitable for use as a first magnetic element 208. For instance, and without limitation, second magnetic element may include a permanent magnet and/or an electromagnet. Second magnetic element 220 may include magnetic poles oriented in a second direction opposite of the orientation of the poles of first magnetic element 208. In an embodiment, electric propulsion assembly 200 includes a motor assembly incorporating stator 204 with a first magnet element and second magnetic element 220. First magnetic element 208 includes magnetic poles oriented in a first direction, a second magnetic element includes a plurality of magnetic poles oriented in the opposite direction than the plurality of magnetic poles in the first magnetic element 208.

Continuing to refer to FIG. 2, second magnetic element 220 may include a plurality of magnets attached to or integrated in hub 216. In an embodiment, hub 216 may incorporate structural elements of the rotor assembly of the motor assembly. As a non-limiting example hub 216 may include a motor inner magnet carrier 224 and motor outer magnet carrier 228 incorporated into the hub 216 structure. In an embodiment motor inner magnet carrier 224 and motor outer magnet carrier 228 may be cylindrical in shape. In an embodiment, motor inner magnet carrier 224 and motor out magnet carrier 216 may be any shape that would allow for a fit with the other components of the rotor assembly. In an embodiment, hub 216 may be short and wide in shape to reduce the profile height of the rotating assembly of electric propulsion assembly 200. Reducing the profile assembly height may have the advantage of reducing drag force on the external components. In an embodiment, hub 216 may also be cylindrical in shape so that fitment of the components in the rotor assembly are structurally rigid while leaving hub 216 free to rotate about stator.

In an embodiment, motor outer magnet carrier 228 may have a slightly larger diameter than motor inner magnet carrier 224. First magnetic element 208 may be a productive element, defined herein as an element that produces a varying magnetic field. Productive elements will produce magnetic field that will attract and other magnetic elements, including a receptive element. Second magnetic element may be a productive or receptive element. A receptive element will react due to the magnetic field of a first magnetic element 208. In an embodiment, first magnetic element 208 produces a magnetic field according to magnetic poles of first magnetic element 208 oriented in a first direction. Second magnetic element 220 may produce a magnetic field with magnetic poles in the opposite direction of the first magnetic field, which may cause the two magnetic elements to attract one another. Receptive magnetic element may be slightly larger in diameter than the productive element. Interaction of productive and receptive magnetic elements may produce torque and cause the assembly to rotate. Hub 216 and rotor assembly may both be cylindrical in shape where rotor may have a slightly smaller circumference than hub 216 to allow the joining of both structures. Coupling of hub 216 to stator 204 may be accomplished via a surface modification of either hub 216, stator 204 or both to form a locking mechanism. Coupling may be accomplished using additional nuts, bolts, and/or other fastening apparatuses. In an embodiment, an integrated rotor assembly as described above reduces profile drag in forward flight for an electric aircraft. Profile drag may be caused by a number of external forces that the aircraft is subjected to. By incorporating a propulsor 104 into hub 216, a profile of integrated electric propulsion assembly 200 may be reduced, resulting in a reduced profile drag, as noted above. In an embodiment, the rotor, which includes motor inner magnet carrier 224, motor outer magnet carrier 228, propulsor 104 is incorporated into hub 216 to become one integrated unit. In an embodiment, inner motor magnet carrier 212 rotates in response to a magnetic field. The rotation causes hub 216 to rotate. This unit can be inserted into integrated electric propulsion assembly 200 as one unit. This enables ease of installation, maintenance, and removal.

Still referring to FIG. 2, stator 204 may include a through-hole 232. Through-hole 232 may provide an opening for a component to be inserted through to aid in attaching propulsor with integrated rotor to stator. In an embodiment, through-hole 232 may have a round or cylindrical shape and be located at a rotational axis of stator 204. Hub 216 may be mounted to stator 204 by means of a shaft 236 rotatably inserted though through hole 232. Through-hole 232 may have a diameter that is slightly larger than a diameter of shaft 236 to allow shaft 236 to fit through through-hole 232 to connect stator 204 to hub 216. Shaft 236 may rotate in response to rotation of propulsor 104.

Still referring to FIG. 2, integrated electric propulsion assembly 200 may include a bearing cartridge 240. Bearing cartridge 240 may include a bore. Shaft 236 may be inserted through the bore of bearing cartridge 240. Bearing cartridge 240 may be attached to a structural element of a vehicle. Bearing cartridge 240 functions to support the rotor and to transfer the loads from the motor. Loads may include, without limitation, weight, power, magnetic pull, pitch errors, out of balance situations, and the like. A bearing cartridge 240 may include a bore. a bearing cartridge 240 may include a smooth metal ball or roller that rolls against a smooth inner and outer metal surface. The rollers or balls take the load, allowing the device to spin. a bearing may include, without limitation, a ball bearing, a straight roller bearing, a tapered roller bearing or the like. a bearing cartridge 240 may be subject to a load which may include, without limitation, a radial or a thrust load. Depending on the location of bearing cartridge 240 in the assembly, it may see all of a radial or thrust load or a combination of both. In an embodiment, bearing cartridge 240 may join integrated electric propulsion assembly 200 to a structure feature. A bearing cartridge 240 may function to minimize the structural impact from the transfer of bearing loads during flight and/or to increase energy efficiency and power of propulsor. a bearing cartridge 240 may include a shaft and collar arrangement, wherein a shaft affixed into a collar assembly. A bearing element may support the two joined structures by reducing transmission of vibration from such bearings. Roller (rolling-contact) bearings are conventionally used for locating and supporting machine parts such as rotors or rotating shafts. Typically, the rolling elements of a roller bearing are balls or rollers. In general, a roller bearing is a is type of anti-friction bearing; a roller bearing functions to reduce friction allowing free rotation. Also, a roller bearing may act to transfer loads between rotating and stationary members. In an embodiment, bearing cartridge 240 may act to keep a propulsor 104 and components intact during flight by allowing integrated electric propulsion assembly 200 to rotate freely while resisting loads such as an axial force. In an embodiment, bearing cartridge 240 includes a roller bearing incorporated into the bore. a roller bearing is in contact with propulsor shaft 236. Stator 204 is mechanically coupled to inverter housing 240. Mechanically coupled may include a mechanical fastening, without limitation, such as nuts, bolts or other fastening device. Mechanically coupled may include welding or casting or the like. Inverter housing contains a bore which allows insertion by propulsor shaft 236 into bearing cartridge 240.

Still referring to FIG. 2, electric propulsion assembly 200 may include a motor assembly incorporating a rotating assembly and a stationary assembly. Hub 216, motor inner magnet carrier 224 and propulsor shaft 236 may be incorporated into the rotor assembly of electric propulsion assembly 200 which make up rotating parts of electric motor, moving between the stator poles and transmitting the motor power. As one integrated part, the rotor assembly may be inserted and removed in one piece. Stator 204 may be incorporated into the stationary part of the motor assembly. Stator and rotor may combine to form an electric motor. In embodiment, an electric motor may, for instance, incorporate coils of wire which are driven by the magnetic force exerted by a first magnetic field on an electric current. The function of the motor may be to convert electrical energy into mechanical energy. In operation, a wire carrying current may create at least a first magnetic field with magnetic poles in a first orientation which interacts with a second magnetic field with magnetic poles oriented in the opposite direction of the first magnetic pole direction causing a force that may move a rotor in a direction. For example, and without limitation, a first magnetic element 208 in electric propulsion assembly 200 may include an active magnet. For instance, and without limitation, a second magnetic element may include a passive magnet, a magnet that reacts to a magnetic force generated by a first magnetic element 208. In an embodiment, a first magnet positioned around the rotor assembly, may generate magnetic fields to affect the position of the rotor relative to the stator 204. A controller may have an ability to adjust electricity originating from a power supply and, thereby, the magnetic forces generated, to ensure stable rotation of the rotor, independent of the forces induced by the machinery process. Electric propulsion assembly 200 may include an impeller 244 coupled with the shaft 236. An impeller, as described herein, is a rotor used to increase or decrease the pressure and flow of a fluid and/or air. Impeller 244 may function to provide cooling to electric propulsion assembly 200. Impeller 244 may include varying blade configurations, such as radial blades, non-radial blades, semi-circular blades and airfoil blades. Impeller 214 may further include single and/or double-sided configurations. Impeller 214 is described in further detail below.

Figure 3:
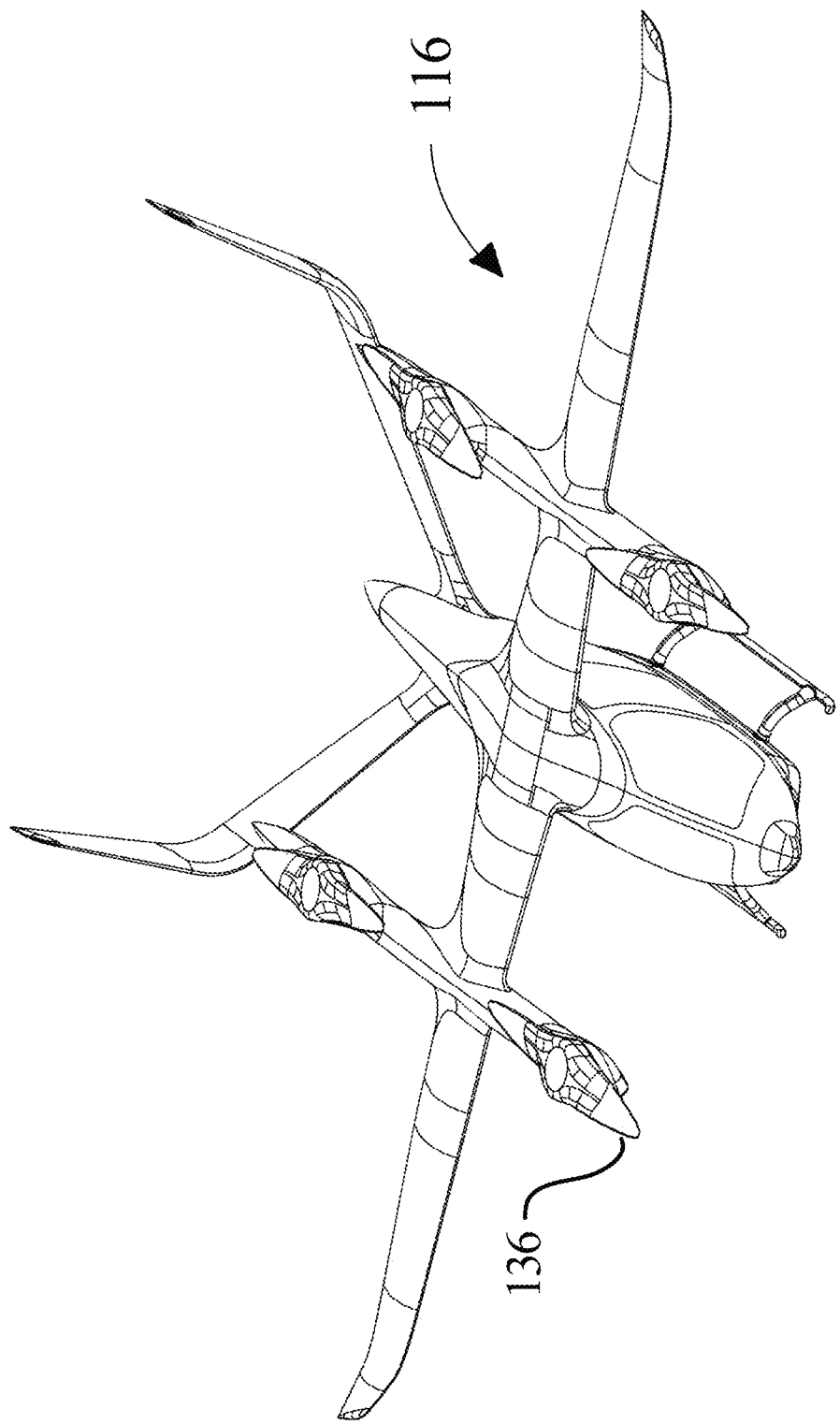
FIG. 3 is an illustration of an exemplary aircraft in one or more aspects of the present disclosure.

Referring now to FIG. 3, an exemplary embodiment of an electric aircraft 116 is illustrated. As used in this disclosure an "aircraft" is any vehicle that may fly by gaining support from the air. As a non-limiting example, aircraft may include airplanes, helicopters, commercial and/or recreational aircrafts, instrument flight aircrafts, drones, electric aircrafts, airliners, rotorcrafts, vertical takeoff and landing aircrafts, jets, airships, blimps, gliders, paramotors, and the like. Aircraft 116 may include an electrically powered aircraft. In embodiments, electrically powered aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof. Electric aircraft may include one or more manned and/or unmanned aircrafts. Electric aircraft may include one or more all-electric short takeoff and landing (eSTOL) aircrafts. For example, and without limitation, eVTOL aircrafts may accelerate plane to a flight speed on takeoff and decelerate plane after landing. In an embodiment, and without limitation, electric aircraft may be configured with an electric propulsion assembly. Electric propulsion assembly may include any electric propulsion assembly as described in U.S. Nonprovisional application Ser. No. 16/603,225, filed on Dec. 4, 2019, and entitled "AN INTEGRATED ELECTRIC PROPULSION ASSEMBLY," the entirety of which is incorporated herein by reference.

As used in this disclosure, a vertical take-off and landing (eVTOL) aircraft is an aircraft that can hover, take off, and land vertically. An eVTOL, as used in this disclosure, is an electrically powered aircraft typically using an energy source, of a plurality of energy sources to power aircraft. To optimize the power and energy necessary to propel aircraft 116, eVTOL may be capable of rotor-based cruising flight, rotor-based takeoff, rotor-based landing, fixed-wing cruising flight, airplane-style takeoff, airplane style landing, and/or any combination thereof. Rotor-based flight, as described herein, is where the aircraft generates lift and propulsion by way of one or more powered rotors or blades coupled with an engine, such as a "quad-copter," multi-rotor helicopter, or other vehicle that maintains its lift primarily using downward thrusting propulsors. "Fixed-wing flight", as described herein, is where an aircraft is capable of flight using wings and/or foils that generate lift caused by the aircraft's forward airspeed and the shape of the wings and/or foils, such as airplane-style flight.

In one or more embodiments, aircraft 116 may include motor, which may be mounted on a structural feature of an aircraft. Design of motor may enable it to be installed external to the structural member (such as a boom, nacelle, or fuselage) for easy maintenance access and to minimize accessibility requirements for the structure. This may improve structural efficiency by requiring fewer large holes in the mounting area. This design may include two main holes in the top and bottom of the mounting area to access bearing cartridge. Further, a structural feature may include a component of aircraft 116. For example, and without limitation structural feature may be any portion of a vehicle incorporating motor, including any vehicle as described below. As a further non-limiting example, a structural feature may include without limitation a wing, a spar, an outrigger, a fuselage, or any portion thereof; persons skilled in the art, upon reviewing the entirety of this disclosure, will be aware of many possible features that may function as at least a structural feature. At least a structural feature may be constructed of any suitable material or combination of materials, including without limitation metal such as aluminum, titanium, steel, or the like, polymer materials or composites, fiberglass, carbon fiber, wood, or any other suitable material. As a non-limiting example, at least a structural feature may be constructed from additively manufactured polymer material with a carbon fiber exterior; aluminum parts or other elements may be enclosed for structural strength, or for purposes of supporting, for instance, vibration, torque or shear stresses imposed by at least propulsor 136. Persons skilled in the art, upon reviewing the entirety of this disclosure, will be aware of various materials, combinations of materials, and/or constructions techniques.

Figure 4:
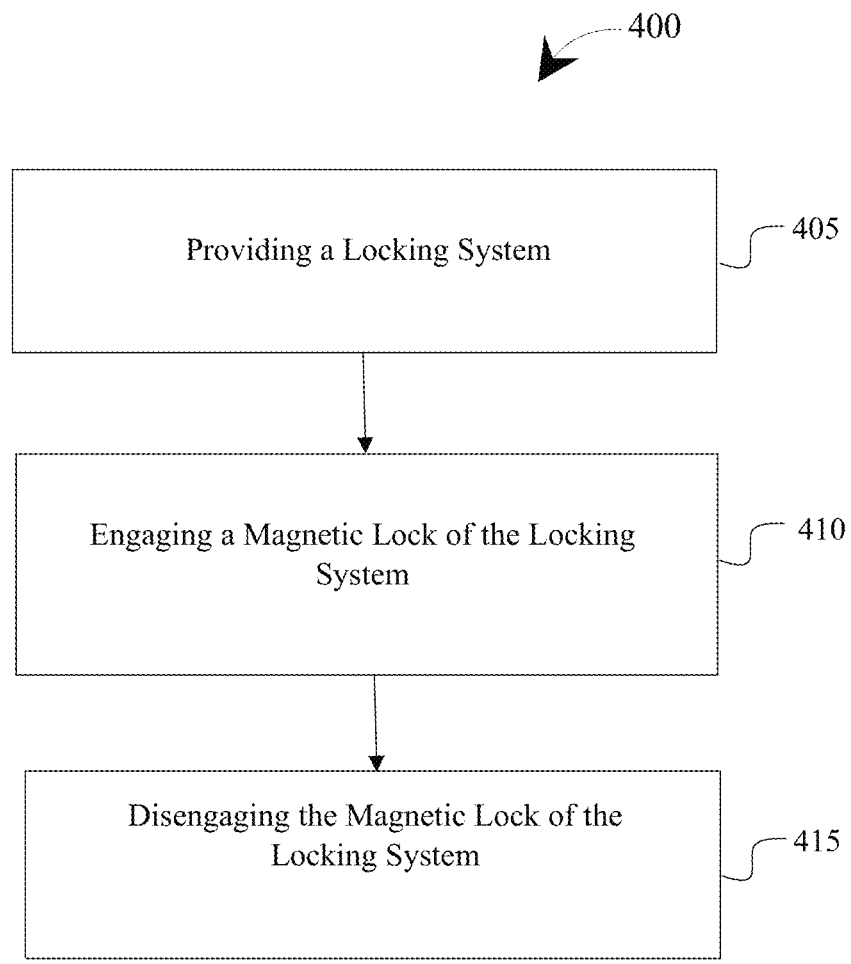
FIG. 4 is a flow chart of an exemplary embodiment of a method of use of the braking system in one or more aspects of the present disclosure.

Referring now to FIG. 4, a flow chart of an exemplary embodiment of the method 400 of locking a rotor to reduce drag is shown. In one or more embodiments, step 405 includes transmitting, by a controller electrically connected to a magnetic lock, a control signal. In one or more embodiments, step 410 includes engaging the magnetic lock, which comprises a first magnetic component and a second magnetic component, in response to the control signal to prevent movement of a rotor of an electric aircraft. In one or more embodiments, step 415 includes disengaging the magnetic lock, in response to the control signal, so that rotor may move freely.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 5:
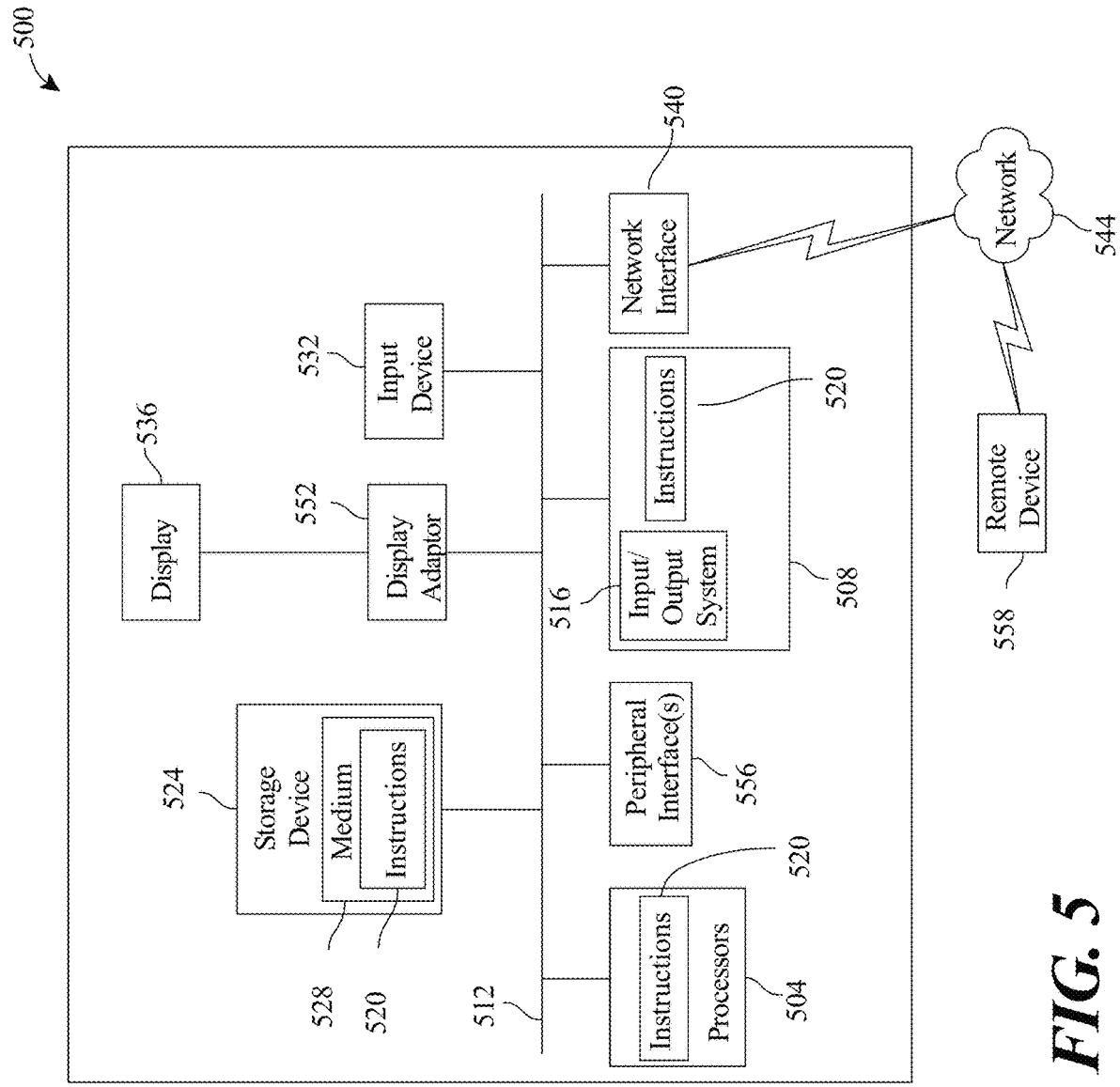
FIG. 5 is a block diagram of a computing system that can be used to implement any one or more of the methodologies disclosed herein and any one or more portions thereof.

FIG. 5 shows a diagrammatic representation of one embodiment of a computing device in the exemplary form of a computer system 500 within which a set of instructions for causing a control system, such as the integrated motor system 200 of FIG. 2, to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 500 includes a processor 504 and a memory 508 that communicate with each other, and with other components, via a bus 512. Bus 512 may include any of several types of bus structures including, but not limited to, a memory bus, a memory controller, a peripheral bus, a local bus, and any combinations thereof, using any of a variety of bus architectures.

Memory 508 may include various components (e.g., machine-readable media) including, but not limited to, a random-access memory component, a read only component, and any combinations thereof. In one example, a basic input/output system 516 (BIOS), including basic routines that help to transfer information between elements within computer system 500, such as during start-up, may be stored in memory 508. Memory 508 may also include (e.g., stored on one or more machine-readable media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

Computer system 500 may also include a storage device 524. Examples of a storage device (e.g., storage device 524) include, but are not limited to, a hard disk drive, a magnetic disk drive, an optical disc drive in combination with an optical medium, a solid-state memory device, and any combinations thereof. Storage device 524 may be connected to bus 512 by an appropriate interface (not shown). Example interfaces include, but are not limited to, SCSI, advanced technology attachment (ATA), serial ATA, universal serial bus (USB), IEEE 594 (FIREWIRE), and any combinations thereof. In one example, storage device 524 (or one or more components thereof) may be removably interfaced with computer system 500 (e.g., via an external port connector (not shown)). Particularly, storage device 524 and an associated machine-readable medium 528 may provide nonvolatile and/or volatile storage of machine-readable instructions, data structures, program modules, and/or other data for computer system 500. In one example, software 520 may reside, completely or partially, within machine-readable medium 528. In another example, software 520 may reside, completely or partially, within processor 504.

Computer system 500 may also include an input device 532. In one example, a user of computer system 500 may enter commands and/or other information into computer system 500 via input device 532. Examples of an input device 532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 532 may be interfaced to bus 512 via any of a variety of interfaces (not shown) including, but not limited to, a serial interface, a parallel interface, a game port, a USB interface, a FIREWIRE interface, a direct interface to bus 512, and any combinations thereof. Input device 532 may include a touch screen interface that may be a part of or separate from display 536, discussed further below. Input device 532 may be utilized as a user selection device for selecting one or more graphical representations in a graphical interface as described above.

A user may also input commands and/or other information to computer system 500 via storage device 524 (e.g., a removable disk drive, a flash drive, etc.) and/or network interface device 540. A network interface device, such as network interface device 540, may be utilized for connecting computer system 500 to one or more of a variety of networks, such as network 544, and one or more remote devices 548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 544, may employ a wired and/or a wireless mode of communication. In general, any network topology may be used. Information (e.g., data, software 520, etc.) may be communicated to and/or from computer system 500 via network interface device 540.

Computer system 500 may further include a video display adapter 552 for communicating a displayable image to a display device, such as display device 536. Examples of a display device include, but are not limited to, a liquid crystal display (LCD), a cathode ray tube (CRT), a plasma display, a light emitting diode (LED) display, and any combinations thereof. Display adapter 552 and display device 536 may be utilized in combination with processor 504 to provide graphical representations of aspects of the present disclosure. In addition to a display device, computer system 500 may include one or more other peripheral output devices including, but not limited to, an audio speaker, a printer, and any combinations thereof. Such peripheral output devices may be connected to bus 512 via a peripheral interface 556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments according to this disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A locking system for an electric propulsor, the system comprising:
    a magnetic lock comprising: a first magnetic component disposed on an inner surface of a cavity configured to house a motor of an electric aircraft, the motor including a rotor, wherein the inner surface is adjacent to a surface of the rotor; and
    a second magnetic components fixedly attached to the surface of the rotor, and disposed about a central axis of the rotor; and
    a controller communicatively connected to the magnetic lock and configured to engage the magnetic lock, in response to a control signal, to prevent a movement of the electric propulsor while the electric aircraft is in flight, wherein magnetic directions of the first magnetic component and the second magnetic component are orthogonal to a thrust direction of the electric propulsor.

2. The system of claim 1, wherein the controller is configured to engage the magnetic lock by transmitting a current through at least one of the first magnetic component and the second magnetic component.

3. The system of claim 1, wherein:
    the first magnetic component comprises an electromagnet; and
    the second magnetic component comprises a permanent magnet.

4. The system of claim 1, wherein:
    the first magnetic component comprises an electromagnet; and
    the second magnetic component comprises a ferromagnetic metal.

5. The system of claim 4, wherein the controller is configured to:
    initiate a current through the first magnetic component to engage the magnetic lock; and
    terminate the current through the first magnetic component to disengage the magnetic lock.

6. The system of claim 1, wherein the electric aircraft is an electric vertical takeoff and landing aircraft.

7. The system of claim 1, wherein:
    the electric propulsor comprises a propulsor shaft; and
    the second magnetic component is fixedly attached to the propulsor shaft.

8. The system of claim 7, wherein the second magnetic component is oriented parallel to the propulsor shaft.

9. The system of claim 1, further comprising a sensor communicatively connected to the controller and configured to detect a rotational speed of the electric propulsor, wherein the controller is further configured to receive a sensor datum from the sensor and engage the magnetic lock when the detected rotational speed of the electric propulsor is below a predetermined threshold.

10. The system of claim 9, wherein the controller is further configured to engage the magnetic lock when the rotational speed of the electric propulsor is below the predetermined threshold and the electric propulsor is not receiving power from a power source of the electric aircraft.

11. The system of claim 1, wherein the controller is further configured to engage the magnetic lock upon receipt of a control signal from a user.

12. The system of claim 1, further comprising an encoder that is communicatively connected to the controller and the motor of the electric propulsor, wherein the encoder is configured to:
    detect a torque input to the motor; and
    transmit feedback to the controller, where the controller is configured to engage the magnetic lock in response to the feedback.

13. The system of claim 1, further comprising a plurality of magnetic locks.

14. A system in an electric aircraft, the system comprising:
    an electric propulsor configured to rotate around a thrust axis;
    an electric motor configured to drive rotation of the electric propulsor;
    a magnetic lock including a first magnetic element and a second magnetic element, the first magnetic element being affixed to an inner surface of a cavity configured to house the electric motor;
    a shaft coupled to the electric propulsor; and
    a controller communicatively connected to the magnetic lock and configured to engage the first magnetic element and the second magnetic element to prevent rotation of the electric propulsor when the electric aircraft is in flight.

15. The system of claim 14, wherein the second magnetic element is affixed to a rotor of the electric motor, the rotor being coupled to the shaft at a location spaced apart from the electric propulsor.

16. The system of claim 14, wherein magnetic directions of the first magnetic element and the second magnetic element are orthogonal to the thrust axis.

17. The system of claim 14, wherein the controller is configured to engage the magnetic lock upon detection of a control signal.

18. A system in an electric aircraft, the system comprising:
- an electric propulsor configured to rotate around a thrust axis;
- an integrated electric propulsion assembly configured to drive rotation of the electric propulsor;
- a magnetic lock including a first magnetic element and a second magnetic element, the second magnetic element being affixed to a hub of the integrated electric propulsion assembly, in which the hub is integral to the electric propulsor;
- a shaft coupled to the electric propulsor; and
- a controller communicatively connected to the magnetic lock and configured to engage the first magnetic element and the second magnetic element to prevent rotation of the electric propulsor when the electric aircraft is in flight.

19. The system of claim 18, wherein the controller is configured to engage the magnetic lock upon detection of a control signal.

20. The system of claim 18, wherein the hub is configured to rotate around a stator of the integrated electric propulsion assembly.

* * * * *